April 8, 1969   L. MICZKA   3,437,448
APPARATUS FOR DETERMINING THE ALCOHOL CONTENT OF EXHALED AIR
Filed Aug. 25, 1966
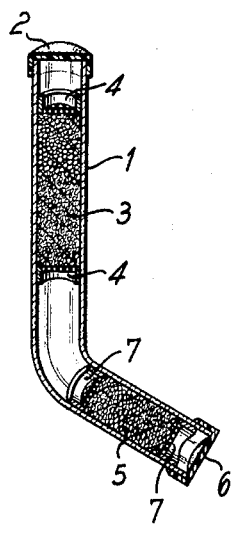
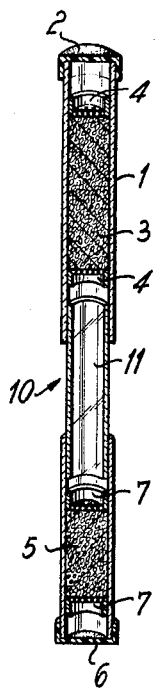
INVENTOR:
LOTHAR MICZKA.
Owen & Owen
ATT'YS.

3,437,448
APPARATUS FOR DETERMINING THE ALCOHOL
CONTENT OF EXHALED AIR
Lothar Miczka, Wellerfeldweg 225,
Marl, Westphalia, Germany
Filed Aug. 25, 1966, Ser. No. 575,104
Claims priority, application Germany, Sept. 23, 1965,
M 66,728
Int. Cl. G01n 33/00
U.S. Cl. 23—254                     9 Claims This invention relates to apparatus for determining the alcohol content of exhaled air and, more particularly, to a testing tube for this purpose. A person under test blows a prescribed quantity of exhaled air through the tube which contains a reagent such as permanganate or a chromate. The reagent responds to the alcohol content of exhaled air by a change of color. The tube also contains an indicator which shows, for instance also by a change of color, that the prescribed quantity of air has been blown through the tube.

Testing tubes, in comparison with the previously known testing devices, in which the amount of air exhaled is determined by use of a bag which has to be inflated to tautness, have the advantage of a substantially simpler construction.

As an indicator which shows, by means of a change in color, that the prescribed quantity of air has been blown through the tube, preferably an indicator, for example cobalt nitrite, is employed. This type of indicator responds to the water content of the exhaled air, which experience shows is substantially constant.

Practical experience gained with such testing tubes has shown that, especially when they are employed in self-administered tests, frequent interruption of the blowing procedure is required to give the person undertaking the test a chance to observe the indicator substance which, for instance by change of color, indicates that the prescribed quantity of air has been blown through the tube. The accuracy of the result of the test is thus unfavourably affected and falsified when, because of a check which is not carried out soon enough, more than the desired quantity of air is blown through the tube.

An object of the present invention is to provide a testing tube which allows observation at any time of the indicator substance which is responding, for example by a change of color, to the amount of air blown through the tube, without the blowing procedure having to be interrupted.

According to the basic conception of the invention, this object is achieved by shaping or curving the tube so that two zones thereof, containing respectively the reagent responsive to the alcohol content of the exhaled air and the substance responsive to the amount of air exhaled, extend at an angle to one another. The tube is often made of a transparent material, such as glass or a transparent plastic material. The zone containing the indicator for the amount of air exhaled, for instance a substance which absorbs the water content of the air, is within the field of vision of the person carrying out the test when the tube is in use.

The shaping or curving of the tube can be achieved in a very simple manner by bending the tube in the course of its manufacture.

According to a further embodiment of the invention, which is advantageous for the purpose of packaging and storing, the testing tube may consist of a pliant, but non-elastic, transparent material so that, just before being used, the tube can be brought from its straight form, by means of a bending procedure, into the form that it is required to possess when the alcohol content of the exhaled air is being determined. In this latter form the zones of the tube which accommodate the two reagents lie at an angle with respect to each other. The transitional zone, between the two zones containing the respective indicators, can be either curving or angular.

While having the same aim and result, the testing tube may according to a further embodiment of the invention, be formed of several parts. Between a part containing the reagent responding to alcohol content and a part containing the indicator substance in respect of the amount of air exhaled, which parts may consist of a rigid material, an intermediate pliant zone may be interposed. The material of which this intermediate zone consists does not necessarily have to be transparent. Such intermediate zone material is preferably of a kind which may be curved, but does not tend, upon completion of the curving process, to return to its original shape. It is, however, also possible to form the intermediate zone from an elastic section of hose. In this case, during use, the user bends the intermediate zone of the tube, either constantly or at intervals, so as to bring into view the zone containing the indicator substance for the amount of air exhaled.

A further advantage of forming the tube in several parts is that the insertion of the indicator substances is simplified.

The leakproof fastening of the piece of hose or tubing constituting the intermediate zone to the rigid two parts containing the indicators may be accomplished in any desired manner. For example, this may be accomplished by pulling the end portions of the hose or tubing over the adjacent ends of the two rigid parts in an airtight and gastight manner. It is also possible, and in some cases more advantageous, to insert the end portions of the hose or tubing into the ends of the two rigid parts and to fasten these end portions of the hose, or tubing inside the rigid parts, in a leakproof manner, through the application of pressure.

Embodiments of the invention, to which, however, this invention is not restricted, are described hereinafter in greater detail with reference to the drawings, in which:

FIGURE 1 shows a first embodiment of the present invention, viewed from the side and shown partially in section; and FIGURE 2 is a view similar to FIGURE 1 showing a second embodiment of the present invention.

In both FIGURES 1 and 2 identical parts are denoted by the same reference numbers.

Referring to the drawings, the testing tube possesses a zone 1 which, up to the time of use, is closed at its free end by a cap 2. The zone 1 contains a reagent 3, responding to the alcohol content of exhaled air, the reagent 3 being held firmly in the zone 1 of the testing tube by an appropriate barrier means 4. The tube possesses a further zone 5, the free end of which, up to the time of use, can likewise be closed by a cap 6. The zone 5 contains, in a predetermined amount and held, for instance, in a perforated or apertured container 7, the indicator material for the prescribed quantity of exhaled air. This indicator material is preferably water-absorbent and a material, for example cobalt nitrite, which when a certain amount of water has been absorbed, indicates by a change of color when a predetermined amount of water has been absorbed.

The tube is shaped or curved so that the two zones 1 and 5 of the tube extend in relation to each other at an angle of approximately 45°. During utilization of the tube, that is, while exhaled air is being blown through it, the zone 5 containing the indicator in respect of the amount of air exhaled is visible to the user who may note the change in color thereof immediately.

In the embodiment of the testing tube illustrated in

FIGURE 1, the curve in the tube, between the zones 1 and 5, is made by a simple and appropriate permanent forming of a transparent material, such as glass or a suitable plastic material, constituting the tube, for example by bending this material by means of heat treatment.

In another modification the tube is made of a transparent, pliant, but non-elastic material which is only bent into the required shape just prior to use.

In the embodiment illustrated in FIGURE 2, the testing tube consists of several parts, 1, 10 and 5, of which the two outer parts 1 and 5 each receive one of the two indicator substances. The central part 10 is constructed of a pliant material. The pliant part 10 makes it possible for the user to manually bend the tube into the shape required during use, that is, the shape in which the zone 5, containing the indicator relating to the amount of air exhaled, lies within the field of vision of the user.

The pliant part 10 of the testing tube consists, in the case of the example of the embodiment, of an elastic section of hose 11 connecting the two zones 1 and 5 to each other in a leakproof manner. The ends of this section of hose are inserted with pressure inside the adjacent ends of the two zones 1 and 5 of the tube so as to be connected to these zones in an airtight and gastight manner.

In another modification, the pliant part 10 is made of a non-elastic material.

Of course, it is also possible to combine the embodiments according to FIGURES 1 and 2 in such a manner that either the zone 1 or the zone 5 is bent beforehand, that is, the curving part is first formed in this one zone, which is then connected to the second zone, of straight formation, by way of a pliant part 10.

While the present invention has been disclosed in connection with a specific arrangement and disposition of the parts, it should be expressly understood that numerous modifications and changes may be made without departing from the scope of the appended claims.

I claim:

1. A device for determining the alcohol content of exhaled air comprising, in combination, a rigid tube of transparent material, an indicator substance responsive to the alcohol content of exhaled air, means for positioning said indicator substance in one longitudinal portion of the tube, a second indicator substance responsive to the exhaled air passing through the tube in order to optically indicate when a prescribed quantity of such air has passed therethrough, and means for positioning said second indicator substance in a second longitudinal portion of the tube, the tube being of a shape such that said first and second longitudinal portions thereof are non-collinear, whereby the said second portion is visible to the user when the said first portion is applied to the mouth.

2. A device according to claim 1, wherein the said first and second portions are substantially straight, a curved intermediate portion being provided between said two straight portions.

3. A device for determining the alcohol content of exhaled air comprising, in combination, a tube of transparent pliant nonelastic material, an indicator substance responsive to the alcohol content of exhaled air, means for positioning said indicator substance in one longitudinal portion of the tube, a second indicator substance responsive to the exhaled air passing through the tube in order to optically indicate when a prescribed quantity of such air has passed therethrough, and means for positioning said second indicator substance in a second longitudinal portion of the tube, said pliant non-elastic material of which the tube is made permitting said tube to be bent into a shape such that said first and second longitudinal portions thereof are non-collinear, whereby the said second portion is visible to the user when said first portion is applied to the mouth.

4. A device for determining the alcohol content of exhaled air comprising, in combination, a tube having first and second end parts and an intermediate part, said end parts being of rigid material and the material of at least the second end part also being transparent, said intermediate part constructed of pliant material, an indicator substance responsive to the alcohol content of the exhaled air in the first end part of the tube, and a second indicator substance responsive to the exhaled air passing through the tube in order to optically indicate when a prescribed quantity of such air has passed therethrough positioned in the second end part of the tube, said tube being formed into a shape such that said first and second end parts thereof are non-collinear, whereby said second end part is visible to the user when the said first part is applied to the mouth.

5. A device according to claim 4, wherein the intermediate part of the tube consists of an elastic piece of hose which is connected between the two end parts in an airtight manner.

6. A device according to claim 5, wherein the ends of the elasitc piece of hose are pushed over the adjacent ends of the two end parts.

7. A device according to claim 5, wherein the ends of the elastic piece of hose are inserted into the two end parts, with pressure which insures leaktightness.

8. A device according to claim 4, wherein said two end parts of the tube are straight.

9. A device according to claim 4, wherein said intermediate part is made of a pliant non-elastic material, which retains its deformed shape after bending.

References Cited

UNITED STATES PATENTS 2,591,691    4/1952    Forrester    23—254 XR
3,009,786    11/1961    Luckey    23—254

MORRIS O. WOLK, Primary Examiner.

R. M. REESE, Assistant Examiner.

U.S. Cl. X.R.

23—232